(12) United States Patent
Brown et al.

(10) Patent No.: US 7,870,266 B2
(45) Date of Patent: Jan. 11, 2011

(54) FINDING A MANAGEMENT SERVER

(75) Inventors: Norman P. Brown, Tomball, TX (US);
Andreas Funk, Stockholm (SE);
Ronald T. Truong, Houston, TX (US);
Roger A. Cao, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 763 days.

(21) Appl. No.: 11/378,743

(22) Filed: Mar. 17, 2006

(65) Prior Publication Data
US 2007/0220122 A1 Sep. 20, 2007

(51) Int. Cl.
*G06F 15/16* (2006.01)

(52) U.S. Cl. ..................................... 709/227
(58) Field of Classification Search ........................ None
See application file for complete search history.

(56) References Cited

U.S. PATENT DOCUMENTS

| 5,974,547 A * | 10/1999 | Klimenko ....................... 713/2 |
| 7,257,731 B2 * | 8/2007 | Hunt et al. ....................... 714/4 |
| 7,376,823 B2 * | 5/2008 | Iszlai et al. ....................... 713/1 |
| 2005/0055575 A1 | 3/2005 | Evans et al. |
| 2005/0278395 A1 * | 12/2005 | Sandaire ....................... 707/203 |
| 2006/0056630 A1 * | 3/2006 | Zimmer et al. .............. 380/256 |
| 2006/0161652 A1 * | 7/2006 | Takizawa et al. ............ 709/227 |
| 2008/0046708 A1 * | 2/2008 | Fitzgerald et al. .............. 713/2 |
| 2008/0098458 A2 * | 4/2008 | Smith et al. ..................... 726/3 |

FOREIGN PATENT DOCUMENTS

WO  WO 2005/055072   *  6/2005

OTHER PUBLICATIONS

Wikipedia, definition for "Embedded Linux," http://en.wikipedia.org/wiki/Embedded_Linux, pp. 1-3 (at least as early as Nov. 15, 2005).
Wikipedia, definition for "Windows CE," http://en.wikipedia.org/wiki/Windows_CE, pp. 1-3 (at least as early as Nov. 15, 2005).
Wikipedia, definition for "Windows XP Embedded," http://en.wikipedia.org/wiki/Windows_XP_Embedded, p. 1 (at least as early as Nov. 15, 2005).
Wikipedia, definition for "Embedded operating system," http://en.wikipedia.org/wiki/Embedded_operating_system, p. 1 (at least as early as Nov. 15, 2005).
J. Postel, RFC 768, "User Datagram Protocol," pp. 1-3, Aug. 28, 1980.
S. Alexander et al., RFC 2132, "DHCP Options and BOOTP Vendor Extensions," pp. 1-32 (Mar. 1997).
R. Droms, RFC 1541, "Dynamic Host Configuration Protocol," pp. 1-37 (Oct. 1993).

* cited by examiner

*Primary Examiner*—Moustafa M Meky
*Assistant Examiner*—Clayton R Williams

(57) ABSTRACT

To find a management server, a computer selects one of plural techniques of obtaining an address of the management server. One of the plural techniques comprises the computer exchanging configuration messaging with a configuration server to obtain the address of the management server.

15 Claims, 2 Drawing Sheets

FINDING A MANAGEMENT SERVER

BACKGROUND

In some networks, when a computer is initially started, various management tasks are performed with respect to the computer. Typically, such management tasks are performed by a management server that is coupled to the network. To find a management server, a computer often broadcasts a User Datagram Protocol (UDP) packet onto the network, which broadcast UDP packet is received by all nodes on the network. UDP is described in Request for Comments (RFC) 768, entitled "User Datagram Protocol," dated August 1980. A management server monitors for broadcast UDP packets, and records the address of each new computer identified by a broadcast UDP packet.

More recently, for security reasons and to lower bandwidth usage of a network, many organizations are disabling the use of UDP communications on networks. If UDP is disabled on a network, then a computer that has just started on a network may not be able to find a management server, since broadcast UDP packets transmitted by the computer will be blocked and thus will be unable to reach a management server. As a result, the management server may not notice that a computer has started on a network, which prevents the management server from performing management tasks with respect to the computer. The computer will therefore not be configured properly on the network, which may prevent proper functioning of the computer on the network.

BRIEF DESCRIPTION OF THE DRAWINGS

Some embodiments of the invention are described with respect to the following figures.

DETAILED DESCRIPTION

Figure 1:
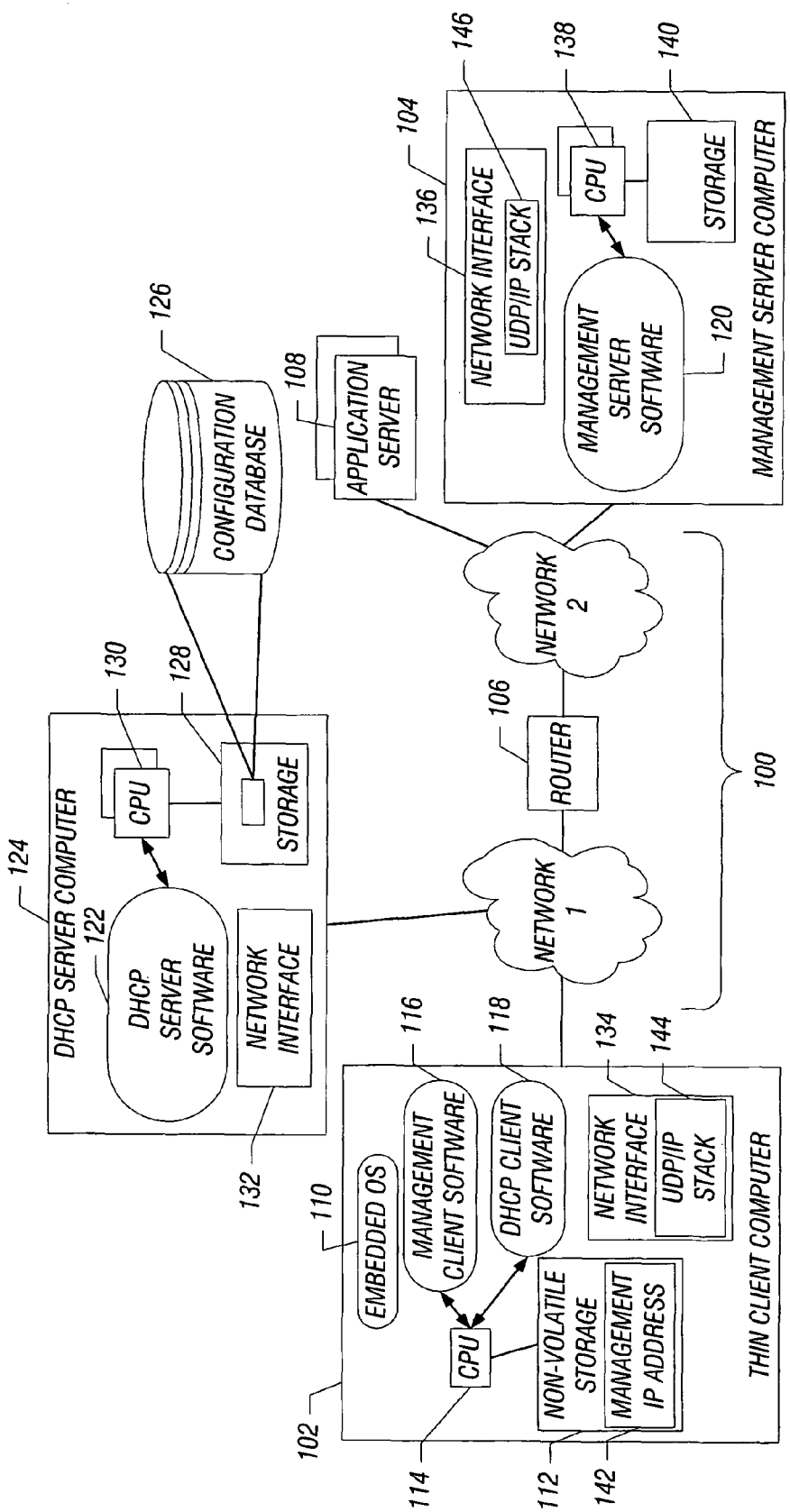
FIG. 1 is a block diagram of an example network that incorporates an embodiment of the invention.

FIG. 1 illustrates a "thin client" computer 102 coupled over a network 100 to a management server computer 104. The network 100 is itself made up of one or more networks, such as network 1 and network 2, with network 1 and network 2 coupled by one or more routers 106. In some arrangements, network 1 and network 2 can be subnets. A subnet is a portion of a network that shares a common address component. For example, in an Internet Protocol (IP) network, a subnet contains devices whose IP addresses have the same prefix (e.g., prefix 100.100.100). In other arrangements, subnets are not used. IP version 4 is defined in RFC 791, entitled "Internet Protocol," dated September 1981; and IP version 6 is described in RFC 2460, entitled "Internet Protocol, Version 6 (IPv6) Specification," dated December 1998.

A "thin client" computer refers to a computer having reduced features, such as an operating system with reduced capabilities and a storage having reduced capacity. Also, a thin client computer generally has a reduced set of software applications running on the thin client computer. Generally, a thin client computer is used to access capabilities on one or more application servers 108 (also coupled to the network 100). In the ensuing discussion, reference is made to thin client computers. However, it is noted that in alternative embodiments, other types of client computers (standard computers with full features rather than reduced features) can be used instead.

The application servers 108 can provide any one or more of the following services: run applications for performing various tasks, provide storage to store databases of information, and so forth. For example, the application servers 108 can be servers used in a bank, where financial and account information of customers is stored. The thin client computer 102 of FIG. 1 can be a terminal used by a bank teller (or other bank personnel) in the bank for accessing financial and account information stored in the application servers 108 (such as for the purpose of making deposits, withdrawals, and so forth). In a different example, the application servers 108 can be part of an airline reservation system, and the thin client computer 102 can be used by a reservation agent for booking trips on behalf of customers of the airline. The arrangement of FIG. 1 can be applied to numerous other types of applications. Note that there usually is a plurality of thin client computers 102 for use by multiple users (such as call agents, tellers, and so forth).

According to some embodiments, the thin client computer 102 includes an embedded operating system 110. An embedded operating system is an operating system designed to be relatively compact and efficient, with various features and functionalities of non-embedded or normal operating systems omitted. Examples of embedded operating systems include WINDOWS® CE, WINDOWS® XP embedded, embedded Linux, a real-time operating system (RTOS), and so forth.

The thin client computer 102 also includes a non-volatile storage 112, which can be implemented as a hard disk drive, a non-volatile integrated circuit (IC) storage device (such as a flash memory and the like), or other storage device. For reduced costs, the non-volatile storage 112 has a smaller capacity than storage used in standard computers with full-featured operating systems. The non-volatile storage 112 is coupled to a central processing unit (CPU 114), on which various software modules are executable. For example, the embedded operating system 110 is executable on the CPU 114. Other software in the thin client computer 102 includes a management client software module 116 and a DHCP (Dynamic Host Configuration Protocol) client software module 118.

The management client software module 116 is used to communicate with a management server software module 120 in the management server computer 104. The DHCP client software module 118 is used to communicate with a DHCP server software module 122 in a DHCP server computer 124. DHCP is described in RFC 1541, entitled "Dynamic Host Configuration Protocol," dated October 1993. Definition of DHCP options and vendor-specific options (for inclusion in DHCP messages) is specified by RFC 2132, entitled "DHCP Options and BOOTP Vendor Extensions," dated March 1997.

DHCP defines messaging between the client computer 102 and the DHCP server computer 124 for the purpose of obtaining configuration information of the client computer 102 from the DHCP server computer 124. As discussed further below, in accordance with some embodiments, a client computer and the DHCP server computer 124 are configured such that the DHCP server computer 124 is able to provide an address (such as an Internet Protocol (IP) address) of the management server computer 104 to the client computer 102 in a configuration message (defined by DHCP). By using DHCP messaging to allow the client computer 102 to find the IP address of the management server computer 104, UDP (User Datagram Protocol) broadcasting for the purpose of finding a management server computer would not have to be performed so that the client computer 102 can still identify itself to the management server computer 104 even in networks that block UDP communications.

The DHCP server computer 124 is an example of a configuration server that contains a database 126 of configuration information used for storing configuration information for various configuration clients, such as the client computer 102. The configuration requests and responses are exchanged between the configuration client (e.g., client computer 102) and the configuration server (e.g., DHCP server computer 124) for the purpose of retrieving configuration information of the configuration client from the configuration server. Moreover, in accordance with some embodiments, a further configuration information included in a DHCP response from the DHCP server computer 124 to the client computer 102 is the IP address of the management server computer 104. The configuration database 126 is stored in a storage 128 of the DHCP server computer 124. The DHCP server computer 124 also includes one or plural CPUs 130 on which the DHCP server software module 122 is executable.

More generally, instead of reference to DHCP server software module 122, reference is made to a configuration server software module. Similarly, in the client computer 102, instead of a DHCP client software module 118, reference is made more generally to a configuration client software module. In alternative embodiments, instead of using DHCP messages between the client computer 102 and the configuration server computer 124, other types of configuration messaging can be used. Thus, generally, a configuration response from a configuration server to a client can include an address of a management server.

Each of the DHCP server computer 124, client computer 102, and management server computer 104 includes a network interface 132, network interface 134, and network interface 136, respectively, that is coupled to the network 100.

The management server software module 120 in the management server computer 104 is able to perform various management tasks with respect to the client computer 102 (via communication with the management client software module 116 in the client computer 102). Examples of management tasks include any one or more of the following: rebooting the client computer 102; obtaining an inventory of various aspects of the client computer 102, such as the type of CPU, storage capacity, serial number, type of operating system, software versions, and so forth; updating or adding software applications at the client computer 102; performing operating system updates at the client computer 102; retrieving an image of software on the client computer 102, such as an image of the operating system and application software along with various data stored in the non-volatile storage 112; and other management tasks.

The management server computer 104 also includes one or more CPUs 138 that are coupled to a storage 140. The management server software module 120 is executable on the one or more CPUs 138.

Also, in accordance with some embodiments, the network interface 136 of the management server computer 104 also includes a UDP/IP (User Datagram Protocol/Internet Protocol) stack 146, which includes network interface layers for the purpose of performing UDP/IP communications (UDP messaging carried in IP packets) over the network 100. The network interface 134 of the client computer 102 also includes a UDP/IP stack 144 for communicating with the UDP/IP stack 146 of the management server computer 104.

In accordance with some embodiments, the client computer 102 is able to selectively use one of at least two techniques for finding the management server computer 104 by obtaining an address, such as an IP address, of the management server computer 104. As noted above, a first technique of obtaining the IP address of the management server computer 104 is by exchanging configuration messages between the DHCP client software module 118 in the client computer 102 and the DHCP server software module 122 in the DHCP server computer 124. A DHCP response sent from the DHCP server computer 124 to the client computer 102 in response to a DHCP request from the client computer 102 contains a vendor-specific option field that is defined to store the IP address of the management server computer 104. The vendor-specific option field that contains the IP address of the management server computer 104 is stored in the configuration database 126. Thus, each of multiple client computers 102 coupled to the network 100 is able to access the DHCP server computers 124 to retrieve the IP address of the management server computer 104 for the purpose of enabling communications between each client computer 102 and the management server computer 104.

In some cases, the DHCP server computer 124 may not be configured to store a vendor-specific option field for containing the IP address of the management server computer 104. In such an arrangement, the client computer 102 may not be able to obtain the IP address of the management server computer 104 from the DHCP server computer 124. In this arrangement, the client computer 102 can select a second technique to use for finding the management server computer 104, namely by sending a broadcast UDP message or packet over the network 100. The broadcast UDP packet is received by all nodes on the network 100, including the management server computer 104. When the management server computer 104 sees the UDP packet, the management server computer 104 sends its IP address to the client computer 102.

By selectively employing one of at least two techniques of obtaining the IP address of the management server computer 104 to find the management server computer 104, flexibility is enhanced. For example, in cases where the router 106 is configured to block UDP packets, use of the second technique (that involves a broadcast UDP packet) would not be successful in identifying the IP address of the management server computer 104. In this scenario, use of the DHCP configuration procedure allows the client computer 102 to obtain the IP address from the DHCP server computer 124 instead of from the management server computer 104.

Alternatively, in another scenario, the DHCP server computer 124 may not be configured to store the IP address of the management server computer 104. In this case, if the router 106 allows UDP packets to pass through, then the client computer 102 can select use of the broadcast UDP messaging for finding the management server computer 104.

Although only one DHCP server computer 124 and management server computer 104 are depicted in FIG. 1, it is noted that a network 100 can include multiple DHCP server computers and management server computers that may be coupled to different subnets interconnected by various routers. Different routers may be configured differently, with some routers allowing UDP packets, and other routers disabling UDP packets. Also, some DHCP server computers 124 may be configured to store a vendor-specific option field for containing the IP address of the management server computer 104, while other DHCP server computers are not so configured. The ability to select among different techniques for obtaining the IP address of the management server computer 104 allows client computers according to some embodiments flexibility in finding a management server computer despite the obstacles identified above.

Figure 2:
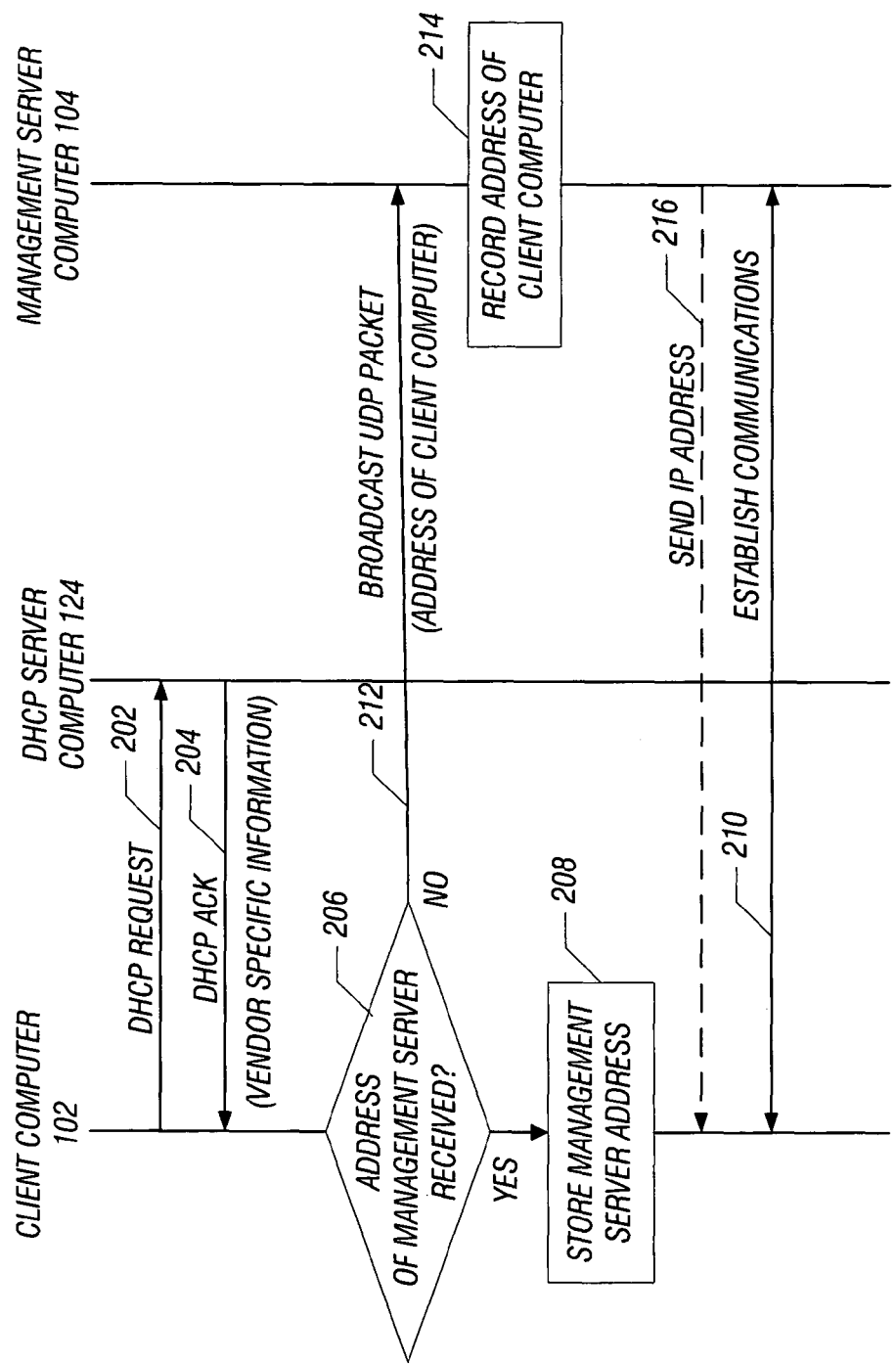
FIG. 2 is a message flow diagram of messages exchanged among a client computer, a DHCP (Dynamic Host Configuration Protocol) server, and a management server, in accordance with an embodiment.

FIG. 2 is a message flow diagram illustrating the flow of messages among the client computer 102, DHCP server computer 124, and management server computer 104, in accordance with an embodiment. At startup, the client computer 102 sends (at 202) a DHCP request to the DHCP server computer 124 over the network 100 (FIG. 1). In response, the DHCP server 124 retrieves configuration information for the thin client computer 102 from the configuration database 126 (FIG. 1), and returns the configuration information in a DHCP ACK message 204. The configuration information contains vendor-specific information. In some cases, such vendor-specific information contains an option field that stores the IP address of the management server computer 104.

More generally, the DHCP request sent at 202 is a configuration request sent from the client computer to a configuration server, and the DHCP ACK message is a configuration response that contains configuration information, which may include the EP address of a management server, if the configuration server is configured to store the IP address of a management server.

Upon receiving the DHCP ACK message, the thin client computer 102 determines (at 206) whether the IP address of the management server has been received. If so, the IP address of the management server computer 104 is stored (at 208) (as management IP address 142 in non-volatile storage 112 in FIG. 1). Once the IP address of the management server 104 is known by the client computer 102, communications can be established (at 210) between the client computer 102 and the management server computer 104. For example, the client computer 102 can send various messages regarding the status of the client computer 102 and can send messages requesting that the management server computer 104 perform jobs with respect to the client computer 102 (such as install software, run scripts, reboot, and so forth). The management server computer 104 sends one or more commands to the client computer 102 to perform the requested jobs.

If the IP address of the management server computer 104 is not received in the configuration response sent at 204, then the client computer 102 selects the second technique of obtaining the IP address of the management server by sending (at 212) a broadcast UDP packet (containing the address of the client computer) to the management server computer 104. The management server computer 104 records (at 214) the address of the client computer in the management server computer 104. Also, the management server computer 104 sends (at 216) a message containing the IP address of the management server computer 104 to the client computer 102 such that the client computer 102 can establish communications (at 210) with the management server computer 104, as discussed above.

Note that the transmission at 216 is performed in response to the broadcast UDP packet sent at 212. In other words, the transmission at 216 does not occur if the client computer 102 has obtained the IP address of the management server from the DHCP server computer 124. Thus, the client computer 102 selects the first technique (involving use of configuration messages such as DHCP messages) for finding the management server in response to detecting that a configuration response from the configuration server contains the IP address of the management server. Alternatively, the client computer 102 selects the second technique (involving use of a broadcast UDP packet) of finding the management server in response to detecting that a configuration response from the configuration server does not contain the IP address of the management server.

In addition to enhanced flexibility, other benefits that may be provided by some embodiments are listed below. For example, if the configuration procedure is performed to obtain the IP address of the management server, the content of the option field containing the IP address of the management server can be easily changed, such as when there are conflicts between two or more management servers. A further benefit is that by using the configuration procedure to retrieve the IP address of the management server, the management tasks performed by the management server with respect to the client computer can be performed across different subnets, such as the subnets coupled by a router 106 in FIG. 1. Thus, even if a router (such as router 106 in FIG. 1) is configured to block UDP packets, the client computer would still be able to find a management server.

Instructions or code of software described above (including the management client software module 116, DHCP client software module 118, DHCP server software module 122, and management server software module 120 in FIG. 1) are loaded for execution on a processor (e.g., CPUs 114, 130, or 138). The processor includes microprocessors, microcontrollers, processor modules or subsystems (including one or more microprocessors or microcontrollers), or other control or computing devices.

Data and instructions (of the software) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method performed by a computer, comprising:
selecting one of plural techniques of obtaining an address of a management server,
wherein one of the plural techniques comprises the computer exchanging configuration messaging with a configuration server to obtain the address of the management server,
wherein a second of the plural techniques comprises the computer sending a broadcast message to the management server to obtain the address of the management server, wherein the second of the plural techniques is selected in response to determining that the address of the management server was not successfully obtained using the exchange of configuration messaging between the computer and the configuration server; and
after obtaining the address of the management server, establishing, by the computer, communication with the management server to request the management server to perform a management task with respect to the computer, wherein the management task is one or more selected from the group consisting of the management server obtaining information regarding one or more of hardware and software of the computer, and the management sever retrieving a software image from the computer.

2. The method of claim 1, wherein sending the broadcast message comprises sending a User Datagram Protocol (UDP) broadcast message.

3. The method of claim 1, wherein exchanging the configuration messaging comprises:
sending a configuration request from the computer to the configuration server; and
in response to the configuration request, receiving a configuration response containing the address of the management server.

4. The method of claim 1, wherein exchanging the configuration messaging comprises:
sending a Dynamic Host Configuration Protocol (DHCP) request from the computer to the configuration server; and
in response to the DHCP request, receiving a DHCP response containing the address of the management server.

5. The method of claim 1, further comprising:
after obtaining the address of the management server, the computer sending at least one of a message regarding a status of the computer and a message regarding a job to be performed by the management server with respect to the computer.

6. The method of claim 1, wherein obtaining the information regarding one or more of hardware and software of the computer comprises obtaining one or more of information relating to a type of CPU, information relating to storage capacity, information relating to a type of operating system, and information relating to a version of software.

7. An article comprising a non-transitory computer-readable storage medium containing instructions that when executed cause a computer to:
select one of plural techniques of obtaining an address of a management server, wherein a first of the plural techniques includes:
sending a configuration request to a configuration server;
receiving a configuration response from the configuration server in response to the configuration request;
determine whether the address of the management server was provided to the computer in the configuration response;
in response to determining that the address of the management server was not provided, select a second of the plural techniques that includes sending a broadcast message to the management server to obtain the address of the management server; and
after obtaining the address of the management server, establish communication with the management server to request the management server to perform a management task with respect to the computer, wherein the management task is one or more selected from the group consisting of the management server obtaining information regarding one or more of hardware and software of the computer, and the management sever retrieving a software image from the computer.

8. The article of claim 7, wherein sending the broadcast message comprises sending a User Datagram Protocol (UDP) broadcast message.

9. The article of claim 8, wherein sending the configuration request comprises sending a Dynamic Host Configuration Protocol (DHCP) request, and wherein receiving the configuration response comprises receiving a DHCP response.

10. The article of claim 7, wherein determining whether the address of the management server was provided comprises determining whether an Internet Protocol address of the management server was provided.

11. The article of claim 7, wherein obtaining the information regarding one or more of hardware and software of the computer comprises obtaining one or more of information relating to a type of CPU, information relating to storage capacity, information relating to a type of operating system, and information relating to a version of software.

12. A computer comprising:
an embedded operating system;
a processor; and
a configuration software module executable on the processor to:
select one of plural techniques to obtain an address of a management server, wherein a first of the plural techniques includes:
sending a configuration request to a configuration server; and
receiving a configuration response transmitted by the configuration server in response to the configuration request wherein the configuration response includes a vendor-specific field for storing the address of the management server;
determine whether the address of the management server was provided to the computer in the configuration response;
in response to determining that the address of the management server was not provided, select a second of the plural techniques that includes sending a broadcast message to the management server to obtain the address of the management server; and
a management client software module executable on the processor to, after the address of the management server has been obtained, cooperate with the management server to perform one or more of:
providing an image of software on the computer to the management server, and obtaining information regarding one or more of hardware and software of the computer.

13. The computer of claim 12, comprising a thin client computer having a reduced set of features.

14. The computer of claim 12, wherein the configuration request comprises a Dynamic Host Configuration Protocol (DHCP) request, and wherein the configuration response comprises a DHCP response.

15. The computer of claim 12, wherein obtaining the information regarding one or more of hardware and software of the computer comprises obtaining one or more of information relating to a type of CPU, information relating to storage capacity, information relating to a type of operating system, and information relating to a version of software.

* * * * *

UNITED STATES PATENT AND TRADEMARK OFFICE
CERTIFICATE OF CORRECTION

PATENT NO. : 7,870,266 B2
APPLICATION NO. : 11/378743
DATED : January 11, 2011
INVENTOR(S) : Norman P. Brown et al.

Page 1 of 1

It is certified that error appears in the above-identified patent and that said Letters Patent is hereby corrected as shown below:

In column 8, line 30, in Claim 12, after "request" insert -- , --.

Signed and Sealed this
Fourteenth Day of June, 2011

David J. Kappos
*Director of the United States Patent and Trademark Office*